No. 830,012. PATENTED SEPT. 4, 1906.
G. G. SCHROEDER.
DEVICE FOR TAKING UP THE SLACK IN OVERHEAD CABLE TRACKWAYS.
APPLICATION FILED JUNE 6, 1906.
7 SHEETS—SHEET 1.
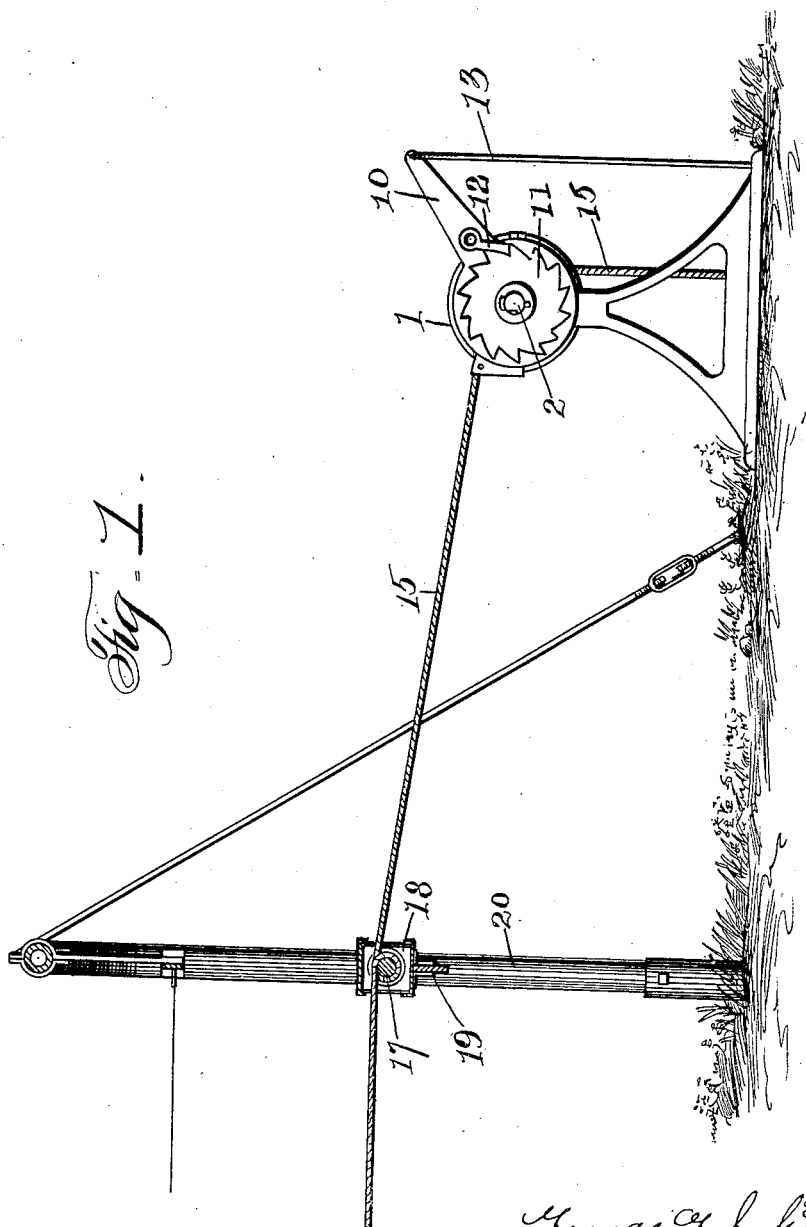

No. 830,012. PATENTED SEPT. 4, 1906.
G. G. SCHROEDER.
DEVICE FOR TAKING UP THE SLACK IN OVERHEAD CABLE TRACKWAYS.
APPLICATION FILED JUNE 6, 1906.
7 SHEETS—SHEET 2.
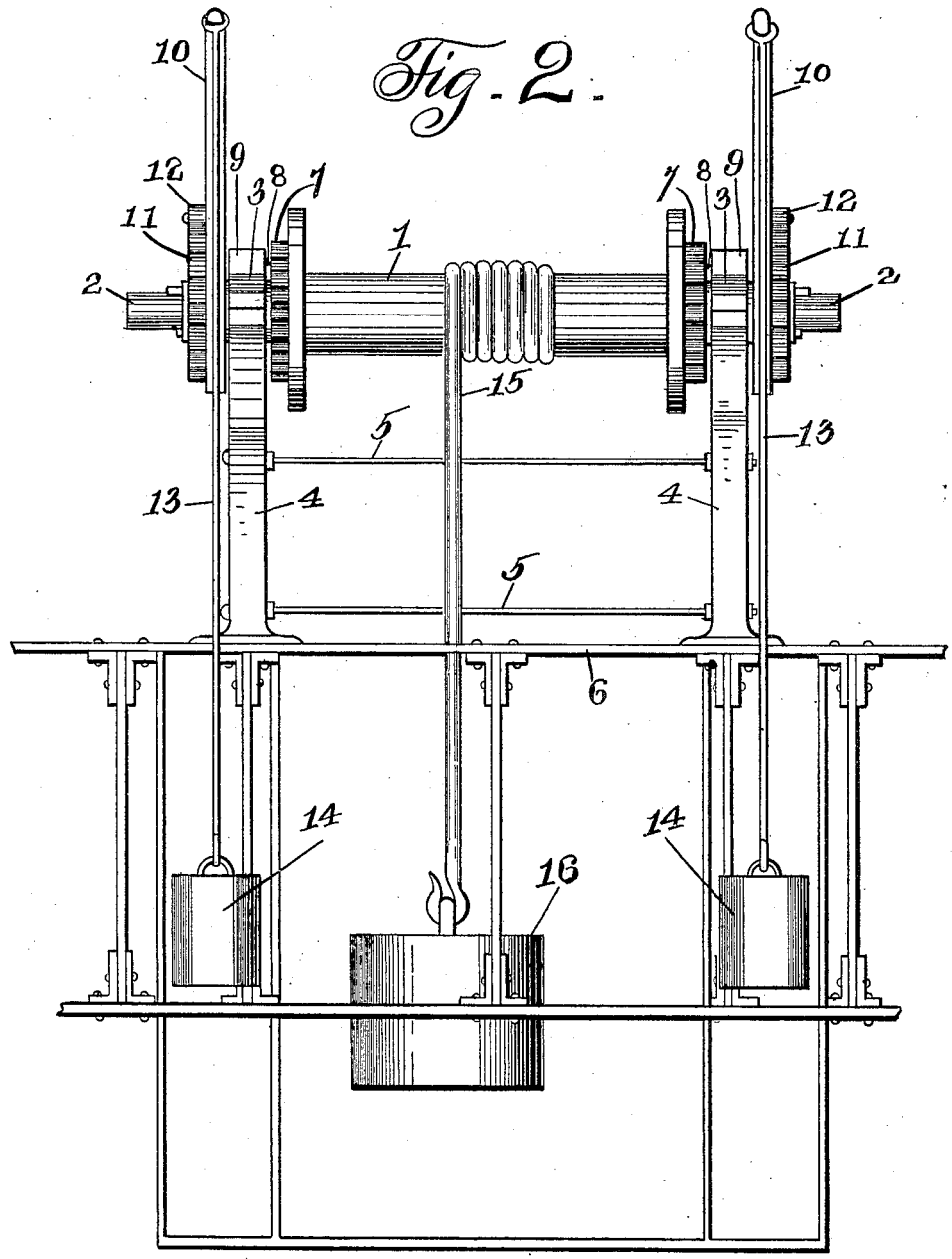

No. 830,012. PATENTED SEPT. 4, 1906.
G. G. SCHROEDER.
DEVICE FOR TAKING UP THE SLACK IN OVERHEAD CABLE TRACKWAYS.
APPLICATION FILED JUNE 6, 1906.
7 SHEETS—SHEET 3.
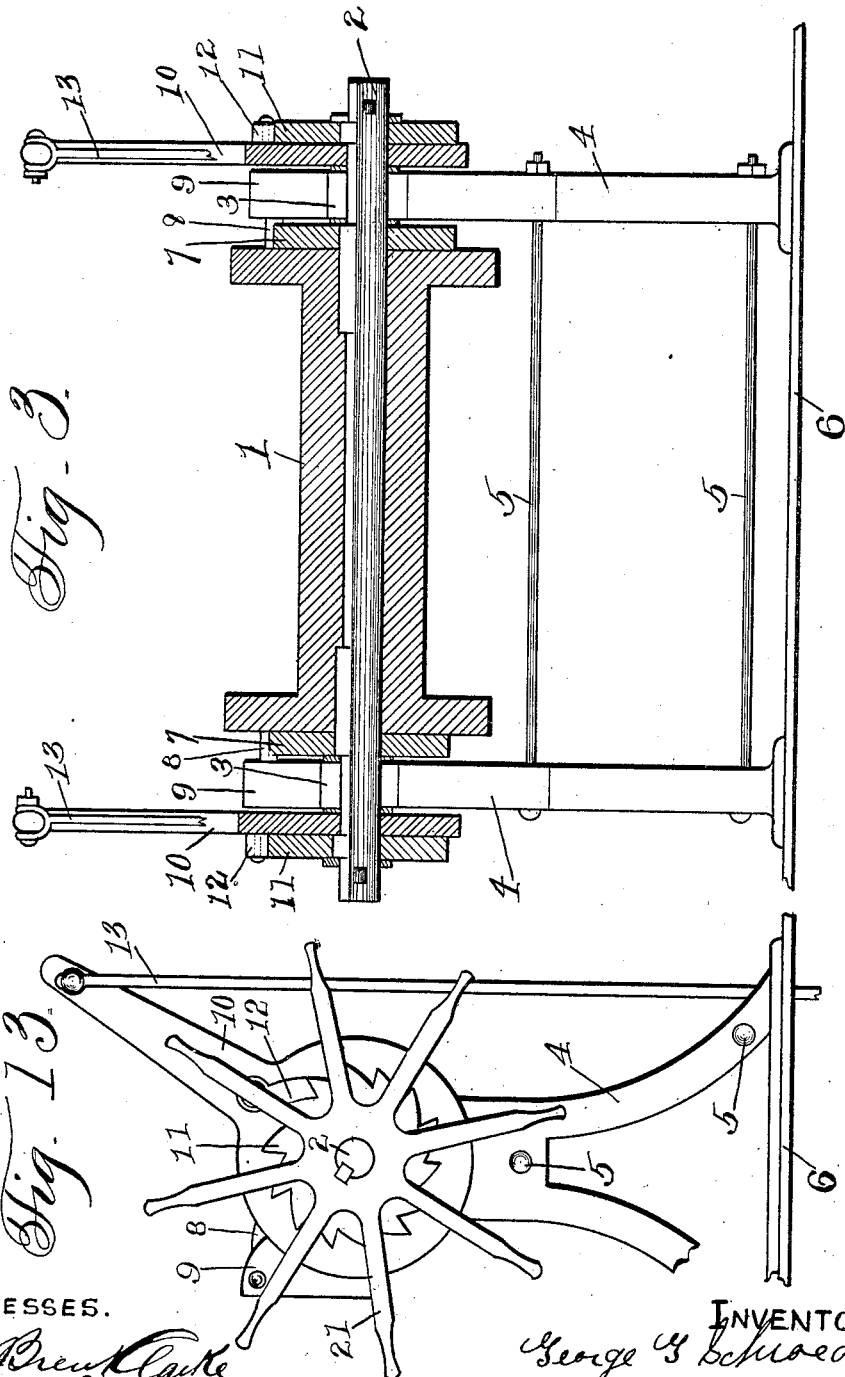
WITNESSES.
INVENTOR
George G. Schroeder No. 830,012. PATENTED SEPT. 4, 1906.
G. G. SCHROEDER.
DEVICE FOR TAKING UP THE SLACK IN OVERHEAD CABLE TRACKWAYS.
APPLICATION FILED JUNE 6, 1906.
7 SHEETS—SHEET 4.
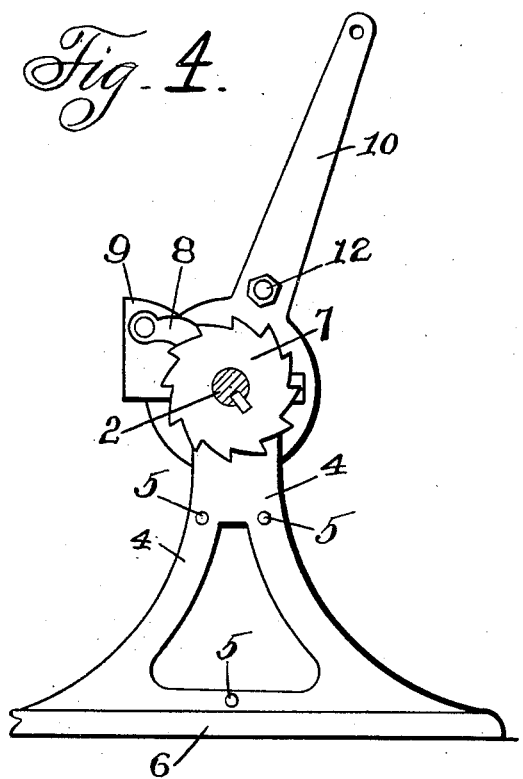
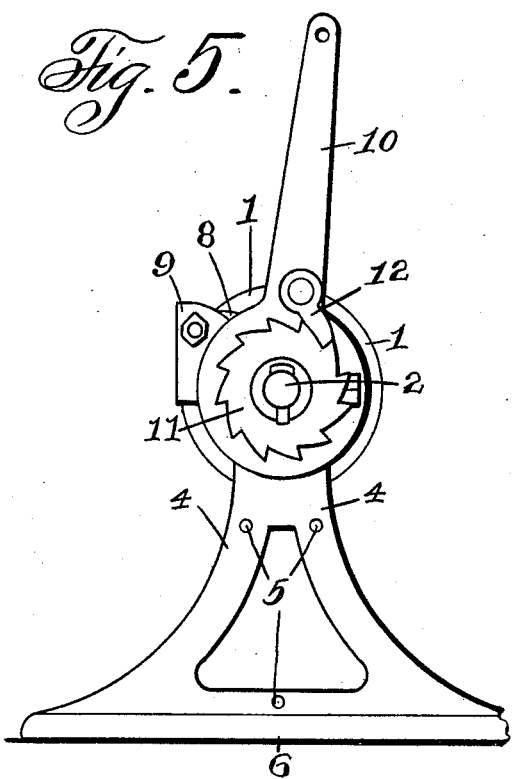
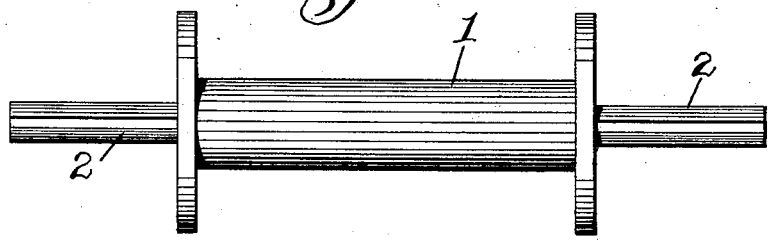
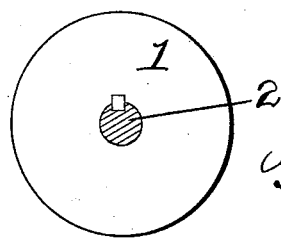
Witnesses. Inventor

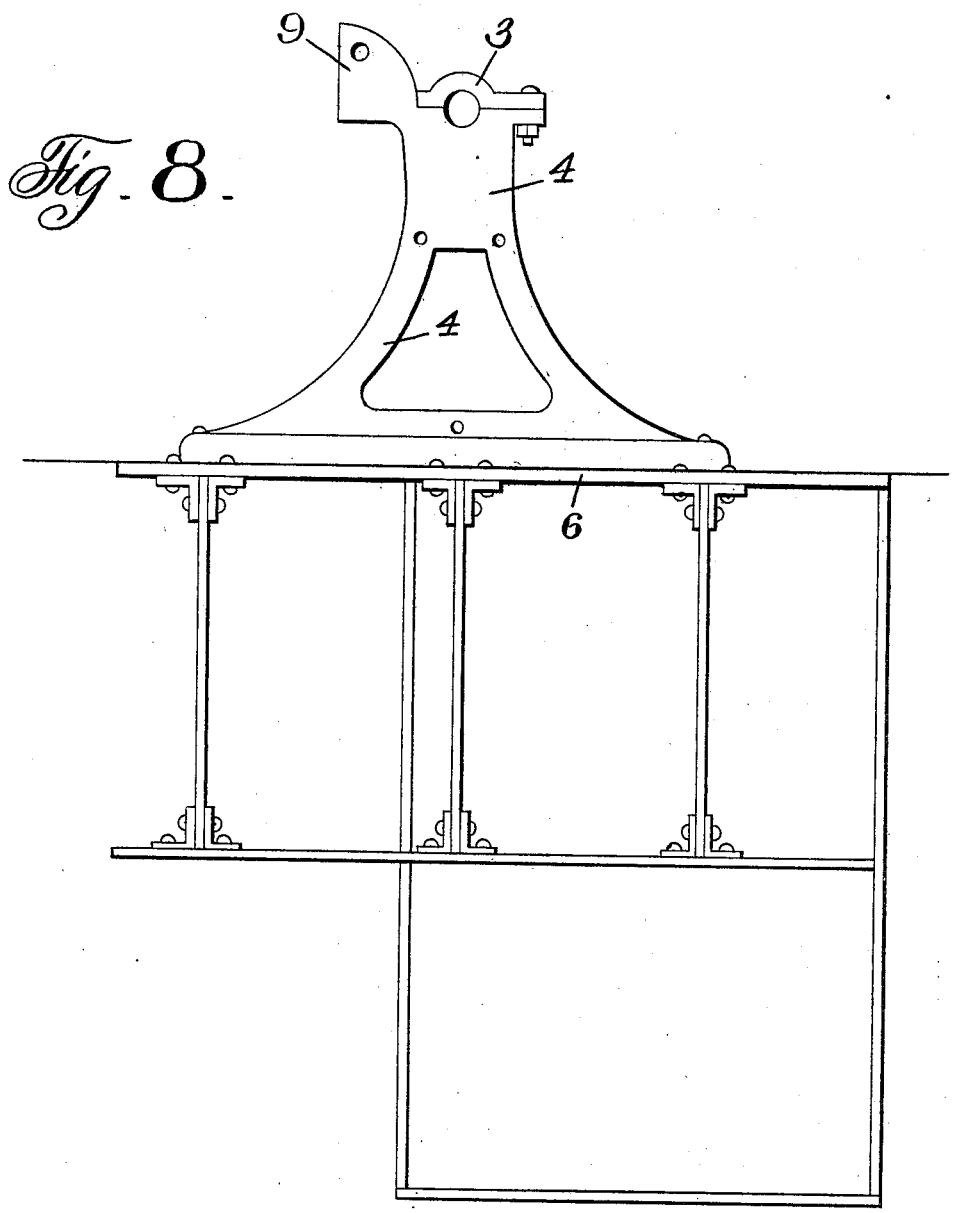

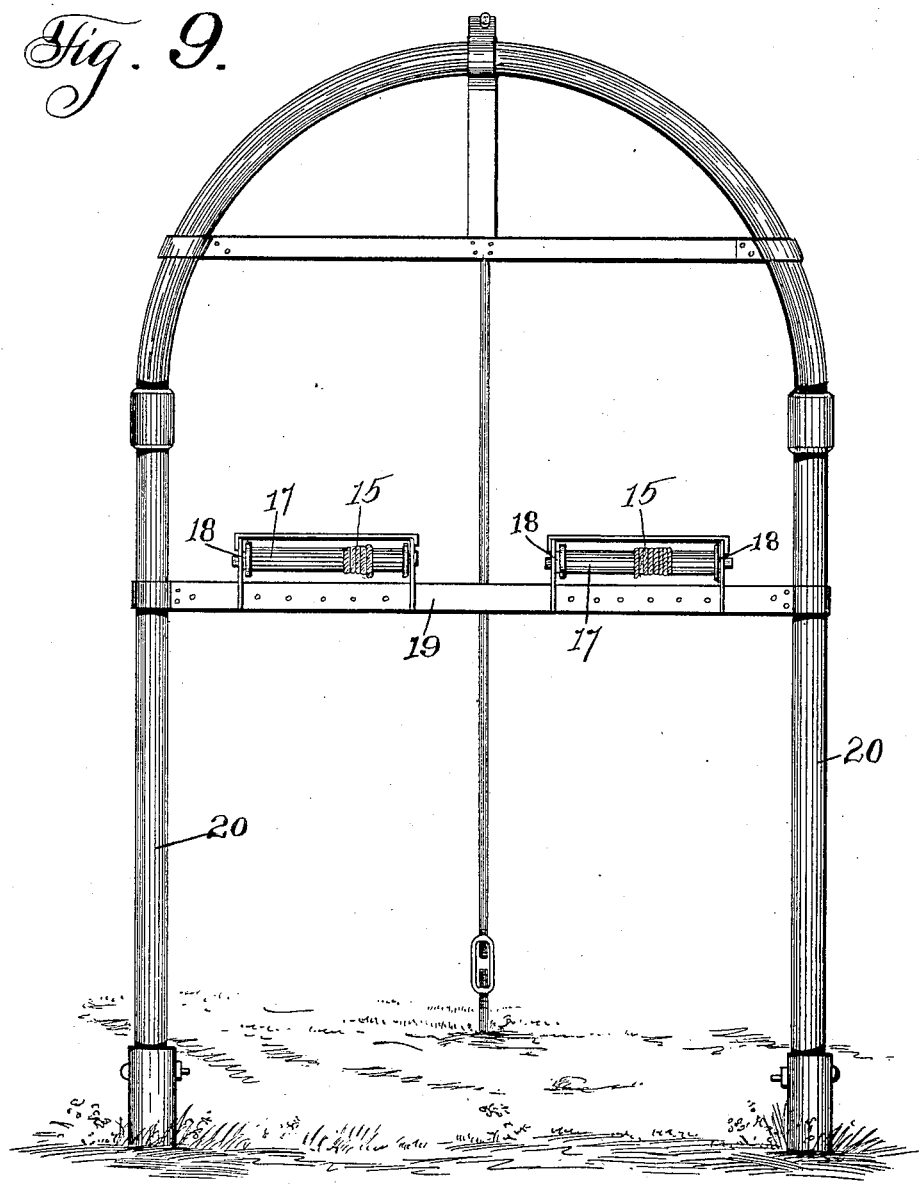

No. 830,012. PATENTED SEPT. 4, 1906.
G. G. SCHROEDER.
DEVICE FOR TAKING UP THE SLACK IN OVERHEAD CABLE TRACKWAYS.
APPLICATION FILED JUNE 6, 1906.
7 SHEETS—SHEET 7.
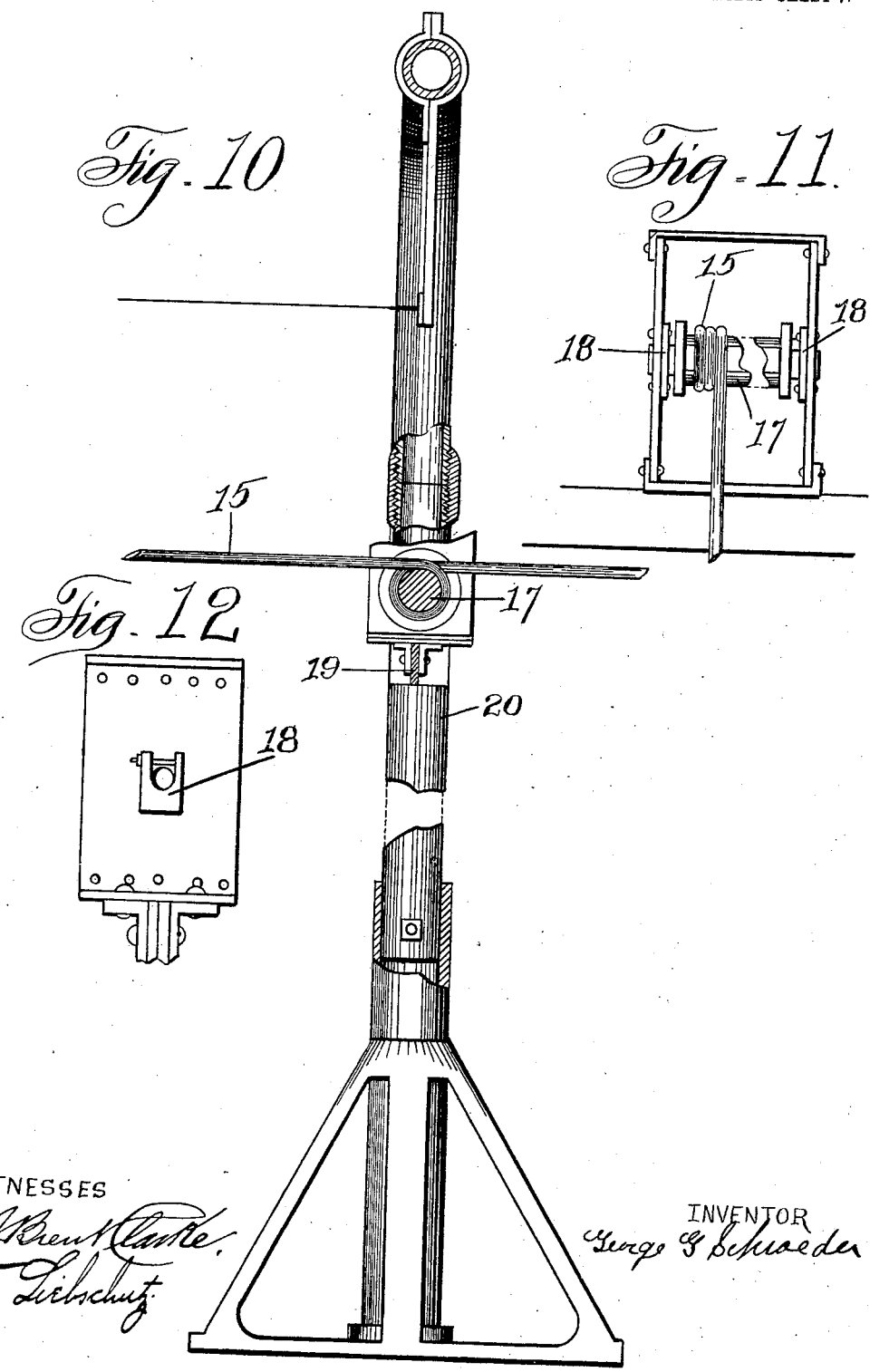

UNITED STATES PATENT OFFICE.

GEORGE G. SCHROEDER, OF WASHINGTON, DISTRICT OF COLUMBIA, ASSIGNOR TO INDUSTRIAL MOTOR COMPANY, A CORPORATION OF THE DISTRICT OF COLUMBIA.

DEVICE FOR TAKING UP THE SLACK IN OVERHEAD-CABLE TRACKWAYS.

No. 830,012.     Specification of Letters Patent.     Patented Sept. 4, 1906.

Application filed June 6, 1906. Serial No. 320,438.

*To all whom it may concern:*

Be it known that I, GEORGE G. SCHROEDER, a citizen of the United States, residing at Washington, in the District of Columbia, have invented certain new and useful Improvements in Devices for Taking Up the Slack in Overhead-Cable Trackways, of which the following is a specification.

This invention has relation to devices for taking up the slack in overhead-cable trackways; and it consists in the novel construction and arrangement of its parts, as hereinafter shown and described.

The object of the invention is to provide a device of the nature as indicated, and which consists, primarily, of a drum mounted for rotation in suitable bearings.

The bearings are supported by uprights, which in turn are mounted upon suitable foundations. A cable winds upon said drum and has attached to one end a weight, which is adapted to move in a vertical line in a suitable pit located below the drum. After winding about the said drum the said cable then passes over a pulley in parallel relation with the said drum and is attached at its other end to the cable-track sought to be kept in taut condition. It will thus be seen that the track-cable is maintained under weight tension. A pair of levers are loosely mounted upon the shaft of the said drum and have weights attached to their ends. The said weights are adapted to work up and down in suitable pits. Ratchet-wheels are fixed to the drum-shaft adjacent said levers and are engaged by pawls carried by the said levers. The said levers and attachments operate to rotate the drum in one direction. The said drum-shaft is provided with suitable ratchet-wheels, which are engaged by pawls located upon extensions of the drum-shaft bearings. The last said ratchet-wheels and pawls operate to prevent the rotation of the drum in the opposite direction.

In the accompanying drawings, Figure 1 is a side elevation of the winding-drum, drum-cable, and shows the pulley in section. Fig. 2 is a side elevation of the drum. Fig. 3 is a longitudinal sectional view of the drum and its attachments. Fig. 4 is a transverse sectional view of the drum-shaft, showing a ratchet-wheel keyed thereto and in elevation. Fig. 5 is a side elevation of the drum-shaft support. Fig. 6 is a side elevation of the drum. Fig. 7 is an end elevation of the drum, showing the same keyed to the shaft, which is in section. Fig. 8 is a side elevation of the drum-support, showing its supporting-frame in side elevation. Fig. 9 is a side elevation of the pulley-supporting means, showing the pulleys mounted thereon. Fig. 10 is a transverse sectional view of the pulley and support. Fig. 11 is a side elevation of the pulley with parts broken away; and Fig. 12 is a side elevation of the pulley-shaft, bearing, and support. Fig. 13 is an end elevation of the drum-shaft, showing a hand-wheel attached thereto.

The drum 1 is keyed upon the drum-shaft 2. Said shaft is journaled in the bearings 3 3, located at the upper ends of the supports 4 4. The said supports are connected by the cross-rods 5 5 and are mounted upon a suitable framework 6, which in conjunction with suitable masonry (not shown) constitutes a foundation. The ratchet-wheels 7 7 are keyed upon the drum-shaft 2 and are located adjacent the ends of the said drum 1. The pawls 8 8 are pivotally attached to the extensions 9 9 of the shaft-bearings 3 3 and engage the ratchets 7 7 to prevent the drum 1 from turning in one direction. The levers 10 10 are loosely mounted upon the shaft 2 on the opposite of the bearings 3 3 from the ratchets 7 7. The ratchets-wheels 11 11 are keyed upon the shaft 2 adjacent the levers 10 10. The pawls 12 12 are pivotally attached to the sides of the levers 10 10 and engage the ratchet-wheels 11 11 in order to maintain the ends of the said levers in elevated position and in order to cause the said levers to swing as the said shaft 2 describes a partial revolution. The cables 13 13 are attached at their upper ends to the upper ends of the levers 10 10, and the weights 14 14 are attached to the lower ends of the said cables 13 13. The said weights are actuated by gravity to rotate the drum 1 in one direction. The cable 15 winds about the drum 1, and the weight 16 is attached to the lower end of the said cable 15. The said weight is actuated by gravity to rotate the drum 1 in one direction. From the drum 1 the cable 15 passes to the pulley 17 and around the same and is attached at its end to the track-cable. (Not shown.) The pulley 17 is journaled in the bearings 18 18, which are supported by the cross-bar 19 of the upright member 20. As shown in Fig. 9 of the drawings, two pulleys 17 17 are provided. These are used where the device is applied to two paralleled track-cables, it being understood that the same or similar drum-cable-drawing devices are associated with each pulley.

From the above description of the construction it is obvious that the gravity-actuated weights 14 14 and 16 operate to rotate the drum 1 in one direction. As the cable 15 is wound upon the said drum the slack in the track-cable is taken. Such slack in the track-cable is due to the natural contraction and expansion of the metal composing such track. In the first instance the gross slack of the track-cable is taken up by gravity actuated upon all of the weights. Then when the upper ends of the levers 10 10 have swung down the weights 14 14 are disconnected and the said levers are elevated. The weights 14 14 are then jacked up into elevated position and again attached to the levers 10 10, when the minor slack of the track-cable will be taken up. As shown in Fig. 13 in the drawings, a hand-wheel 21 is attached to the end of the shaft 2, whereby the same may be rotated by manual labor. When the pawls 8 8 are in engagement with the ratchet-wheels 7 7, the drum 1 is prevented from rotating in a direction opposite to that in which it is turned by the gravity-actuated weights. If, however, it should be desirable to permit the drum 1 to rotate in such direction, the pawls 8 8 are swung back out of engagement with the ratchet-wheels 7 7, when the said drum 1 is free to be rotated in either direction.

Having described my invention, what I claim as new, and desire to secure by Letters Patent, is—

1. A device for taking up slack in suspended cable-track consisting of a journaled drum, a flexible cable winding upon said drum, said cable connecting with the track-cable at one end, a weight attached to the other end of the drum-cable and adapted to be actuated by gravity to rotate the drum in one direction, and a pawl-and-ratchet mechanism associated with the drum and adapted to prevent its rotation in the same in the opposite direction.

2. A device for taking up slack in suspended cable-track consisting of a journaled drum, a pit located below the drum, a cable winding upon said drum, said cable connecting with the track-cable at one end, a weight attached to the other end of the drum-cable and working vertically in said pit, and adapted to be actuated by gravity to rotate the drum in one direction, and a pawl-and-ratchet mechanism associated with the drum and adapted to prevent its rotation in the opposite direction.

3. A device for taking up slack in suspended cable-track consisting of a journaled drum, a pulley journaled in parallel relation with said drum, a cable winding upon the drum and passing around said pulley, and being attached at one end to the track-cable, a weight attached to the other end of said drum-cable and adapted to be actuated by gravity to rotate the drum in one direction, and a pawl-and-ratchet mechanism associated with the drum and adapted to prevent its rotation in the opposite direction.

4. A device for taking up slack in suspended cable-track consisting of a journaled drum, a ratchet located upon the shaft of the drum, a pawl located upon the drawing of the drum and adapted to engage said ratchet, a cable winding upon said drum, said cable connecting with the track-cable at one end, a weight attached to the other end of the drum-cable and adapted to be actuated by gravity to rotate the drum in one direction, the said pawl and ratchet adapted to prevent rotation of the drum in the opposite direction.

5. A device for taking up slack in suspended cable-track consisting of a drum suitably journaled, a cable winding about said drum and being connected at one end to the track-cable, levers journaled upon the drum-shaft, ratchets located upon the drum-shaft adjacent said levers, pawls carried by said levers and adapted to engage said ratchets and weights, attached to the free ends of said levers.

6. A device for taking up slack in suspended cable-track consisting of a drum suitably journaled, a cable winding about said drum and being connected at one end to the track-cable, levers located at both ends of the drum-shaft, ratchets located upon the drum-shaft at each end thereof, pawls carried by the levers and adapted to engage said ratchets and weights attached to the free ends of said levers.

7. A device for taking up slack in suspended cable-track consisting of a drum suitably journaled, a cable winding about said drum and being connected at one end to the track-cable, levers journaled upon the drum-shaft, ratchets located upon the drum-shaft adjacent said levers, pawls carried by said levers and adapted to engage said ratchets, weights attached to the free ends of said levers, a pulley arranged in parallel arrangement to said drum, said drum-cable passing around said pulley.

8. A device for taking up slack in suspended cable-track consisting of a journaled drum, a weighted mechanism for rotating said drum in one direction, a pulley arranged in paralleled arrangement to said drum, a cable passing around said drum and around said pulley and being connected with said cable-track.

9. A device for taking up slack in suspended cable-track consisting of a journaled drum, a wire cable winding about said drum, a cable connecting with the track-cable at one end, a weight attached to the other end of the drum-cable and adapted to be actuated by gravity to rotate the drum in one direction, and a pawl-and-ratchet mechanism associated with the drum and adapted to prevent the rotation of the same in the opposite direction.

10. A device for taking up slack in suspended cable-track consisting of a journaled drum, a pulley journaled in parallel relation with said drum, a cable winding upon said drum and passing around said pulley and connected at one end to the track-cable, and being weighted at its other end, and supplemental weighted arms carried by the drum-shaft and adapted to actuate the drum in one direction only.

11. A device for taking up slack in suspended cable-track consisting of a journaled drum, a pulley journaled in parallel relation with said drum, a cable winding upon the drum and being attached at one end to the track-cable, a weight attached to the other end of said drum-cable and adapted to be actuated by gravity to rotate the drum in one direction, and a pawl-and-ratchet mechanism associated with the drum and adapted to prevent its rotation in the opposite direction.

12. A device for taking up slack in suspended cable-track consisting of a journaled drum, a pulley journaled to one side of said drum, a cable winding upon said drum and being attached at one end to the track-cable, a weight attached to the other end of said drum-cable and adapted to be actuated by gravity to rotate the drum in one direction, and a pawl-and-ratchet mechanism associated with the drum and adapted to prevent its rotation in the opposite direction.

13. A device for taking up slack in suspended cable-track consisting of a journaled drum, a cable winding upon said drum, said cable being connected with the track-cable at one end, weight-actuated levers associated with said drum and having a tendency to rotate the drum in one direction, and means for preventing the rotation of the drum in the opposite direction.

14. A device for taking up slack in suspended cable-track consisting of a journaled drum, a cable winding upon said drum, said cable being connected with the track-cable at one end, a plurality of weight-actuated levers associated with said drum and having a tendency to rotate the drum in one direction, and means for preventing the rotation of the drum in the opposite direction.

15. A device for taking up slack in suspended cable-track consisting of a journaled drum, a cable winding upon the drum, a pulley suitably journaled, a cable winding upon the drum and passing around said pulley and being attached at one end to the track-cable, a weight attached to the other end of said drum-cable and adapted to be actuated by gravity to rotate the drum in one direction, supplemental levers, weight-actuated to assist in the rotation of said drum, and means for preventing the rotation of the drum in the opposite direction.

In testimony whereof I have signed my name to this specification in the presence of two subscribing witnesses.

GEORGE G. SCHROEDER.

Witnesses:
    ELDRIDGE E. JORDAN,
    ALLISON N. LEAPLEY.